United States Patent
Olk et al.

(10) Patent No.: US 10,391,735 B2
(45) Date of Patent: Aug. 27, 2019

(54) USE OF FIBROUS VEILS TO REDUCE CORE CRUSH IN HONEYCOMB SANDWICH STRUCTURES

(71) Applicant: Hexcel Corporation, Dublin, CA (US)

(72) Inventors: Elizabeth Olk, Livermore, CA (US); Olivia Niitsoo, Los Altos, CA (US)

(73) Assignee: HEXCEL CORPORATION, Dublin, CA (US)

( * ) Notice: Subject to any disclaimer, the term of this patent is extended or adjusted under 35 U.S.C. 154(b) by 167 days.

(21) Appl. No.: 15/481,516

(22) Filed: Apr. 7, 2017

(65) Prior Publication Data
US 2018/0290420 A1   Oct. 11, 2018

(51) Int. Cl.
*B32B 3/12*   (2006.01)
*B32B 5/02*   (2006.01)
(Continued)

(52) U.S. Cl.
CPC ............ *B32B 3/12* (2013.01); *B29C 70/44* (2013.01); *B29D 24/005* (2013.01); *B32B 1/04* (2013.01); *B32B 3/26* (2013.01); *B32B 3/263* (2013.01); *B32B 5/024* (2013.01); *B32B 5/142* (2013.01); *B32B 5/26* (2013.01); *B32B 7/12* (2013.01); *B32B 29/02* (2013.01); *B32B 37/146* (2013.01); *B32B 37/12* (2013.01); *B32B 2038/0076* (2013.01); *B32B 2250/03* (2013.01); *B32B 2250/04* (2013.01); *B32B 2250/05* (2013.01); *B32B 2250/40* (2013.01); *B32B 2250/44* (2013.01); *B32B 2255/02* (2013.01); *B32B 2255/26* (2013.01); *B32B 2260/021* (2013.01); *B32B 2260/046* (2013.01);

(Continued)

(58) Field of Classification Search
CPC .............. B32B 1/04; B32B 2038/0076; B32B 2605/18; B32B 37/12; B32B 37/146; B32B 38/00; B32B 3/12; B32B 5/024; B32B 7/12

See application file for complete search history.

(56) References Cited

U.S. PATENT DOCUMENTS 5,685,940 A   11/1997   Hopkins et al.
6,180,206 B1   1/2001   Kain, Jr.
(Continued)

FOREIGN PATENT DOCUMENTS

WO   2016/048885 A1   3/2016

OTHER PUBLICATIONS

Hsiao et al., "Core Crush Problem in the Manufacturing of Composite Sandwich Structures: Mechanisms and Solutions", AIAA Journal, vol. 44, No. 4, Apr. 2006, pp. 901-907.
Buyny et al., "Elimination of Core Crush in Sandwich Structures: Material and Autoclave Process Options", SAMPE, 2004.

*Primary Examiner* — David Sample
*Assistant Examiner* — Elizabeth Collister
(74) *Attorney, Agent, or Firm* — W. Mark Bielawski; David J. Oldenkamp (57) ABSTRACT

Light weight fibrous veils are incorporated into the uncured composite face sheets of a honeycomb sandwich structure in order to reduce the lateral crushing of the honeycomb (core crush) that occurs during curing of the uncured structure in an autoclave or vacuum bag system. The light weight fibrous veils act as friction-promoting layers to reduce the relative movement of the uncured face sheets that leads to core crush during the curing process.

16 Claims, 4 Drawing Sheets

(51) Int. Cl.

| | | |
|---|---|---|
| *B32B 7/12* | (2006.01) | |
| *B32B 37/14* | (2006.01) | |
| *B32B 1/04* | (2006.01) | |
| *B32B 5/14* | (2006.01) | |
| *B32B 5/26* | (2006.01) | |
| *B32B 29/02* | (2006.01) | |
| *B32B 3/26* | (2006.01) | |
| *B29C 70/44* | (2006.01) | |
| *B29D 24/00* | (2006.01) | |
| *B32B 37/12* | (2006.01) | |
| *B32B 38/00* | (2006.01) | |

(52) U.S. Cl.
CPC . *B32B 2262/0269* (2013.01); *B32B 2262/101* (2013.01); *B32B 2262/105* (2013.01); *B32B 2262/106* (2013.01); *B32B 2305/076* (2013.01); *B32B 2307/54* (2013.01); *B32B 2605/00* (2013.01); *B32B 2605/18* (2013.01)

(56) References Cited

U.S. PATENT DOCUMENTS

| | | |
|---|---|---|
| 6,261,675 B1 | 7/2001 | Hsiao et al. |
| 6,475,596 B2 | 11/2002 | Hsiao et al. |
| 6,845,791 B2 | 1/2005 | Schneider et al. |
| 9,314,992 B2 | 4/2016 | Mortimer et al. |
| 2003/0190452 A1* | 10/2003 | Lucas ............ B32B 3/12 428/116 |
| 2005/0074593 A1 | 4/2005 | Day et al. |
| 2008/0311336 A1* | 12/2008 | Dolgopolsky ........ B29C 43/203 428/71 |
| 2011/0294387 A1* | 12/2011 | Simmons ............ B32B 5/022 442/376 |
| 2012/0301665 A1 | 11/2012 | Mortimer et al. |
| 2013/0294925 A1 | 11/2013 | Appleton |
| 2014/0011414 A1* | 1/2014 | Kruckenberg ............ B32B 5/16 442/181 |
| 2014/0106116 A1 | 4/2014 | Bremmer et al. |

* cited by examiner

USE OF FIBROUS VEILS TO REDUCE CORE CRUSH IN HONEYCOMB SANDWICH STRUCTURES

BACKGROUND OF THE INVENTION

1. Field of the Invention

The present invention relates generally to honeycomb sandwich structures in which a honeycomb core is sandwiched between two composite skins or face sheets. More particularly, the present invention is directed to reducing core crush that may occur during the fabrication of such honeycomb sandwich structures.

2. Description of Related Art

Sandwich structures are used in a wide variety of applications where high strength and light weight are required. For example, honeycomb sandwich panels utilizing composite face sheets or skins are widely used in secondary structures in commercial and military aircraft. The cores which are used in most sandwich structures are either lightweight honeycomb or rigid foam. Honeycomb is a popular core structure because of its high strength to weight ratio and resistance to fatigue failures. Honeycomb cores are made from a wide variety of products including metals and composite materials.

The face sheets which are bonded to each side of the sandwich core have also been made from a wide variety of materials which also include metals and composites. One procedure for applying composite face sheets to honeycomb involves using a prepreg face sheet which includes at least one fibrous layer and an uncured resin matrix. Prepreg is a term of art used in the composite materials industry to identify mat, fabric, nonwoven material or roving which has been pre-impregnated with resin and which is ready for final curing. The prepregs are bonded to the edges of the honeycomb using the uncured prepreg resin as the adhesive or by using a separate adhesive.

The face sheets are commonly cured and bonded to the honeycomb edges in an autoclave or vacuum bag using a combination of elevated temperature and pressure. Lateral crushing of the honeycomb cells that are located around the perimeter of honeycomb is a common problem associated with curing of sandwich panels at elevated temperature and pressure. This lateral crushing of the honeycomb cells is referred to as "core crush".

Figure 1:
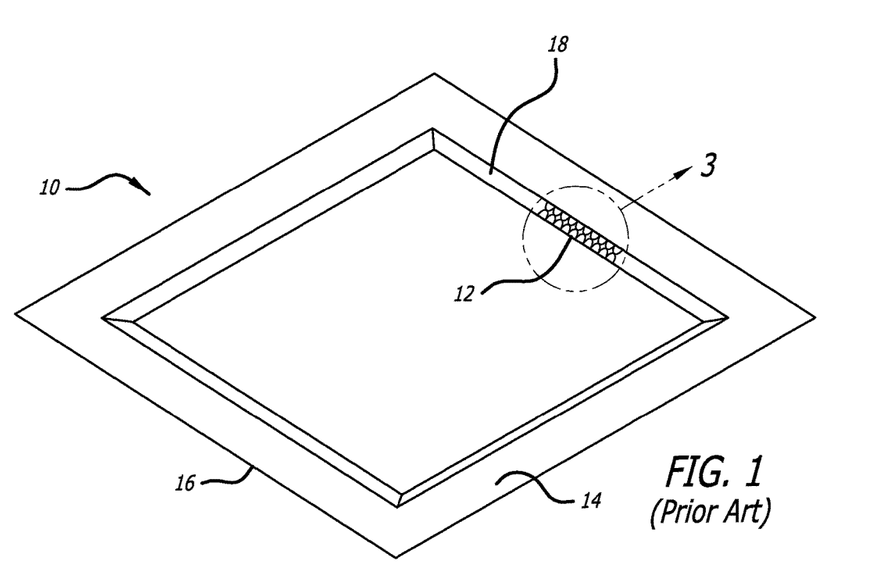
FIG. 1 is a perspective view of a typical prior art uncured honeycomb sandwich structure prior to the structure being subjected to molding to form the final honeycomb sandwich structure.
Figure 3:
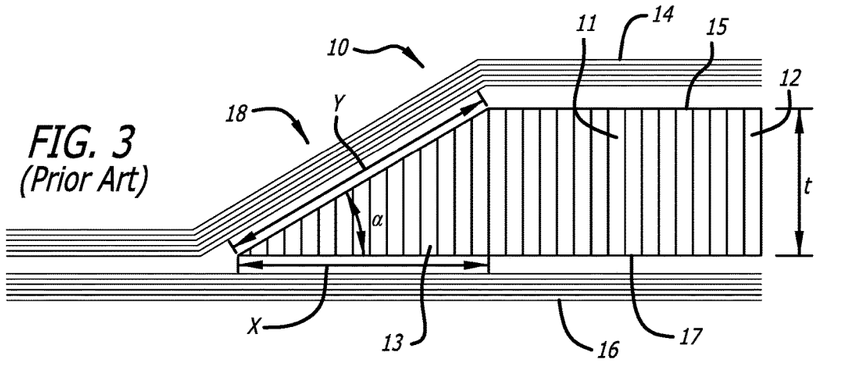
FIG. 3 is a side view of the section of FIG. 1 identified in FIG. 1 by circle 3.

A typical uncured honeycomb sandwich panel is shown at 10 in FIGS. 1 and 3. The uncured honeycomb sandwich panel 10 includes a honeycomb 12 that is sandwiched between a first uncured prepreg face sheet 14 and a second uncured prepreg face sheet 16. The top edge of the honeycomb 15 is chamfered around the perimeter of the honeycomb as shown at 18. The second edge of the honeycomb 17 is usually not chamfered because it sits on a flat mold surface in the autoclave or vacuum bag. Chamfering of the honeycomb perimeter provides some resistance to core crush due to the reduction in core thickness which provides a reduced area for translation of pressure into a lateral core crushing force.

The honeycomb 12 may be viewed as having a primary section 11 having a thickness "t" and a chamfer section 13 having a cross-section corresponding to a right triangle having a hypotenuse "y" and a chamfer angle "a" where the legs of the right triangle are formed by the lateral width of the chamfer "x" and the thickness "t" of the honeycomb.

Figure 2:
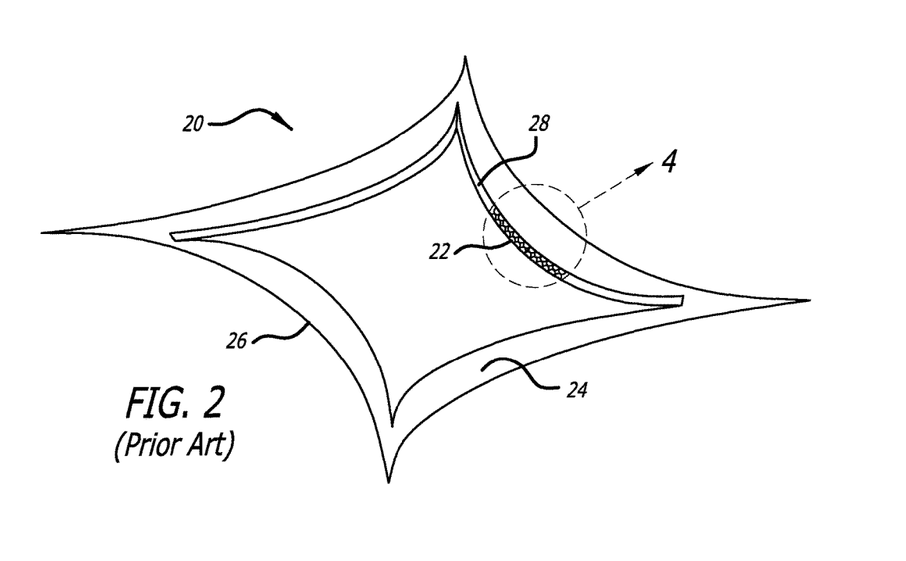
FIG. 2 is a perspective view of the final honeycomb sandwich structure that is formed when the typical prior art uncured honeycomb sandwich structure shown in FIG. 1 undergoes core crush during curing.
Figure 4:
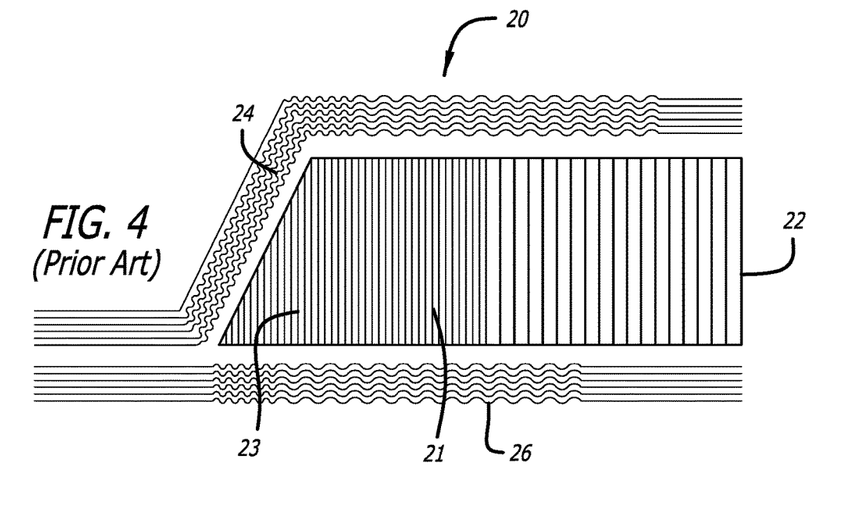
FIG. 4 is a side view of the section of FIG. 2 identified in FIG. 1 by circle 4.

FIGS. 2 and 4 show the core crush that occurs during curing of the uncured honeycomb sandwich panel 10 at elevated temperature and pressure. The resulting cured honeycomb sandwich panel 20 has undergone extensive lateral core crush as shown in FIG. 4. The honeycomb cells in the chamfer section 23 have been collapsed laterally resulting in the lateral width x of the chamfer being substantially reduced. Core crush may even extend past the chamfer section 23 and into the primary section 21 of the honeycomb 22. Core crush also damages and distorts the face sheets as shown at 24 and 26. As can be seen from a comparison of the panels shown in FIGS. 1 and 2, core crush results in an inward distortion of the sandwich panel perimeter.

Core crush has been a manufacturing defect that has been studied extensively. It is a complex phenomenon in which the selection of honeycomb and face sheet materials, as well as the structural design and processing conditions all contribute to the failure mechanism. One simple solution is to make the honeycomb walls stronger so that they are more resistant to lateral crushing. However, such a solution typically increases the panel weight, which is particularly not desirable in aerospace applications. Accordingly, the efforts to reduce core crush have focused on altering the materials and process conditions to reduce core crush without increasing the weight of the final panel structure.

One type of solution to the core crush problem has involved altering the configuration of the fibers in the face sheets in order to increase friction and reduce the slippage that occurs during core crush. This type of solution is exemplified in U.S. Pat. Nos. 6,475,596 and 6,845,791. Another type of solution has been to anchor the perimeter of the face sheets to the mold during autoclaving. This approach is intended to reduce the inward movement of the panel perimeter that typically occurs during core crush. This type of solution is exemplified in U.S. Pat. No. 5,685,940.

Although the above-discussed approaches and other solutions to the core crush problem may be well-suited for their intended purpose, there still is an ongoing need to provide alternative solutions that are simple and effective without increasing the weight of the panel or otherwise adversely affecting panel properties.

SUMMARY OF THE INVENTION

In accordance with the present invention, it was discovered that the core crush phenomenon can be effectively reduced by using a simple procedure that at most only slightly increases the weight of the sandwich structure. The invention is based on the discovery that a light-weight fibrous veil, when strategically inserted between the layers of the uncured face sheets, is capable of acting as a friction-promoting layer that provides a substantial reduction in core crush.

The present invention is directed to an uncured sandwich structure in which a core is sandwiched between two uncured composite face sheets. The uncured sandwich structure includes a honeycomb core having a first edge, a second edge and a perimeter wherein the distance between the first edge and second edge is the thickness of the honeycomb. The honeycomb is made up of a plurality of cells that are formed by walls which extend between the first and second edges of the honeycomb. The honeycomb includes a primary section and a chamfer section which is located around the perimeter of the primary section. The thickness of the honeycomb decreases from the interior border of the chamfer section to the exterior border of the chamfer section.

The uncured sandwich structure further includes an uncured first face sheet located adjacent to the first edge of the honeycomb. The uncured first face sheet has a first inner layer located nearest to the first edge of said honeycomb and a first outer layer. The first inner layer and the first outer layer each are composed of a fibrous layer and uncured resin. The uncured first face sheet covers the entire honeycomb including both the primary section area and the chamfer section area.

An uncured second face sheet is located adjacent to the second edge of the honeycomb. The uncured second face sheet includes a second inner layer located nearest to the second edge of the honeycomb and a second outer layer. The second inner layer and the second outer layer each are also composed of a fibrous layer and uncured resin. The uncured second face sheet also covers the entire honeycomb including both the primary section area and the chamfer section area. The uncured first and second face sheets extend out past the exterior border of the chamfer section to form a flange section that extends around the uncured sandwich structure to form the outside edge of the structure.

As a feature of the invention, a first friction-promoting layer is located in the first face sheet between the first inner layer and the first outer layer. The first friction promoting layer is composed of a first fibrous veil and a first resin binder. The first friction promoting layer is very light weight with the areal weight being from 2 to 20 grams per square meter (gsm). The first friction promoting layer provides a reduction in core crush even though it adds very little weight to the uncured structural panel. In addition, the first friction promoting layer is simply and easily incorporated into the first face sheet.

As a further feature of the invention, a second friction-promoting layer is located in the second face sheet between the second inner layer and second first outer layer. The second friction promoting layer is composed of a first fibrous veil and a first resin binder. The second friction promoting layer is also very light weight with the areal weight being from 2 to 20 grams per square meter (gsm). The second friction promoting layer is simply and easily incorporated into the second face sheet. It was discovered that incorporating friction-promoting layers into both the first and second face sheets provides a substantial reduction in core crush.

As an additional feature of the invention, the friction-promoting layers may be limited in size so that they do not cover the entire area of the face sheets. Instead, the friction-promoting layers are located over the chamfered sections and extend into the primary section so as to only partly cover the primary section. This feature of the invention provides friction promotion in the areas of the honeycomb that are most susceptible to core crush while at the same time limiting the amount of veil material that is used. Veil material tends to be expensive. Accordingly, it is desirable to limit the amount of veil material that is used while still providing the desired resistance to core crush.

The present invention is also directed to the panels made by curing the uncured sandwich structures and the method for making such panels. The invention is also directed to the method for making the uncured sandwich structures.

In accordance with the present invention, the use of light weight fibrous veils, as friction-promoting layers to reduce core crush in chamfered sandwich structures, provides a simple and effective alternative to the presently existing solutions to this ongoing manufacturing problem.

The above described and many other features and attendant advantages of the present invention will become better understood by reference to the following detailed description when taken in conjunction with the accompanying drawings.

DETAILED DESCRIPTION OF THE INVENTION

The present invention is useful in reducing core crush in any of the conventional sandwich structures where a core is sandwiched between two uncured composite face sheets or skins with or without adhesive ply between the core and the skins and then further processed by heating and application of pressure. The core may be any of the known conventional core materials used in sandwich panels. However, the invention is particularly applicable to honeycomb cores of the type used in the aerospace industry. Such honeycomb cores may be made from metals, such as aluminum, plastic or a composite material.

Honeycomb made from a composite material is preferred. A preferred honeycomb composite material is aramid fiber paper that has been coated with a resin. Resin-coated aramid fiber paper is widely used in making honeycomb cores for aircraft structural panels. For example, HRH®10 is a honeycomb made by Hexcel Corporation (Dublin, Calif.) that is composed of NOMEX® aramid paper which has been coated with a phenolic resin. HRH®36 is a honeycomb made by Hexcel Corporation (Dublin, Calif.) that is composed of KEVLAR® aramid paper which has been coated with a phenolic resin. KEVLAR® aramid paper is also produced by E.I. DuPont de Nemours & Company (Wilmington, Del.). As is well known. NOMEX® aramid paper is composed of meta-aramid fibers, whereas KEVLAR® aramid paper is made from para-aramid fibers. Both HRH®10 honeycomb and HRH®36 honeycomb have been widely used as the core in aircraft structural panels. Other resin-coated aramid paper material may also be used, such as the aramid fiber-based honeycomb material described in U.S. Pat. No. 885,896, the contents of which is hereby incorporated by reference.

The dimensions of the honeycomb can be varied widely. For aircraft use, the honeycomb cores will typically have ⅛ to ½ inch (3.2-12.7 mm) wide cells with the cores being ⅛ inch (3.2 mm) to 2 inches (50.8 mm) thick (distance between the honeycomb edges). The thickness of the honeycomb walls may also be varied with typical honeycomb walls being on the order of 0.001 inch (0.25 mm) to 0.005 inch (0.13 mm) thick. The combination of cell size, wall thickness and density of the material that is used determines the weight of the core which is expressed in pounds per cubic foot (pcf). Honeycomb having weights on the order of 2 pcf to 12 pcf are preferred.

In general, the face sheets or skins of sandwich structures can be made form a wide variety of materials including metals, plastics and composite materials. However, the present invention is directed to face sheets made from uncured composite materials that are cured after being applied to the honeycomb. Sandwich panels made using such uncured composite materials as the face sheets are particularly susceptible to core crush due to low friction which causes slippage between the plies during curing.

Uncured face sheets typically include at least one fibrous layer and an uncured resin. In accordance with the present invention, the face sheet must include at least two fibrous layers or plies and an uncured resin matrix. Exemplary fiber materials that may be used to form the fibrous layers or plies include glass, aramid, carbon, ceramic and hybrids thereof. The fibers may be woven, unidirectional or in the form of random fiber mat. Woven carbon fibers are preferred, such as plain, harness satin, twill and basket weave styles that have areal weights from 80-600 gsm, but more preferably from 190-300 gsm.

The carbon fibers that are used in the fibrous layers may have from 3,000-40,000 filaments per tow, but more preferably 3,000-12,000 filaments per tow. All of which are commercially available. Similar styles of glass fabric may also be used with the most common being 7781 glass fabric having an areal weight of 303 gsm and 120 glass fabric having an areal weight of 107 gsm.

The resin matrix that impregnates the fibrous layers of the face sheet may be an epoxy resin, phenolic resin or other suitable resin, such as polyester resins, bismaleimide resins, polyimide resins, polyamideimide resins and polyetherimide resins. Preferred faces sheets are those composed of carbon fibers combined with an epoxy resin matrix. Preferred exemplary fibrous layers or plies are preferably formed from plies of prepreg, which is a fibrous layer that has been pre-impregnated with resin. Prepreg is commercially available from a number of sources. It was found that the use of veils in accordance with the present invention allows one to avoid core crush even when using prepreg impregnated with resins having widely varying rheologies.

Preferred prepreg for use in forming the face sheet layers include any of the commercially available prepregs that are typically used for sandwich panels in the aerospace and automotive industries. For example, prepregs sold by Hexcel Corporation under the tradename HexPly® (Dublin, Calif.) are suitable. Prepregs containing carbon fibers and epoxy resins are preferred.

In accordance with the present invention, a friction-promoting layer is placed between the fibrous layers of one or both face sheets in order to increase frictional locking between the layers and reduce core crush. It was discovered that the friction-promoting layer can be light weight (20 gsm or less) in order to keep the amount of weight added to the final sandwich panel at a minimum, while at the same time providing a reduction in core crush. It was also discovered that the friction-promoting layer must be sufficiently heavy (2 gsm or more) in order to have an effect on core crush. Accordingly, the weight of the friction-promoting layer should be from 3 to 20 gsm. Veils having areal weights of from 4 to 10 gsm are preferred because they provide a desirable combination of core crush reduction and minimum weight addition.

The friction promoting layer is preferably composed of a fibrous veil and a resin binder. Veils that are a combination of carbon fibers with an epoxy binder or a cross linked styrene acrylic resin binder are preferred. Other suitable binder resins include polyvinyl alcohol, styrene, cross-linked polyester, co-polyester, polyurethane, fluoropolymer and polyimide. Veils made from other fibers and combinations of resin binder are suitable provided they have similar friction promoting properties. Suitable veils are commercially available from a number of commercial sources including Optiveil® 20352A and T2548-32, which are available from Technical Fibre Products Inc. (Kendal, England). Veils are preferably wet laid nonwoven carbon fiber veils which include both the veil and resin binder when the veil is incorporated into the sandwich panel. Alternatively, the veils may be applied as a dry layer without resin binder.

The fiber portion of the veil typically makes up from 5 to 15 weight percent of the veil with the remainder being binder resin. The fibers that make up the veil are not in the form of multifilament tows. Instead, the veils are composed of randomly oriented filaments that have individual diameters in the range of 3 to 25 microns. Filament diameters of 3 to 10 microns are preferred. The filaments are typically from 5 to 25 mm long with filaments that are between 5 and 20 mm long being preferred.

Figure 5:
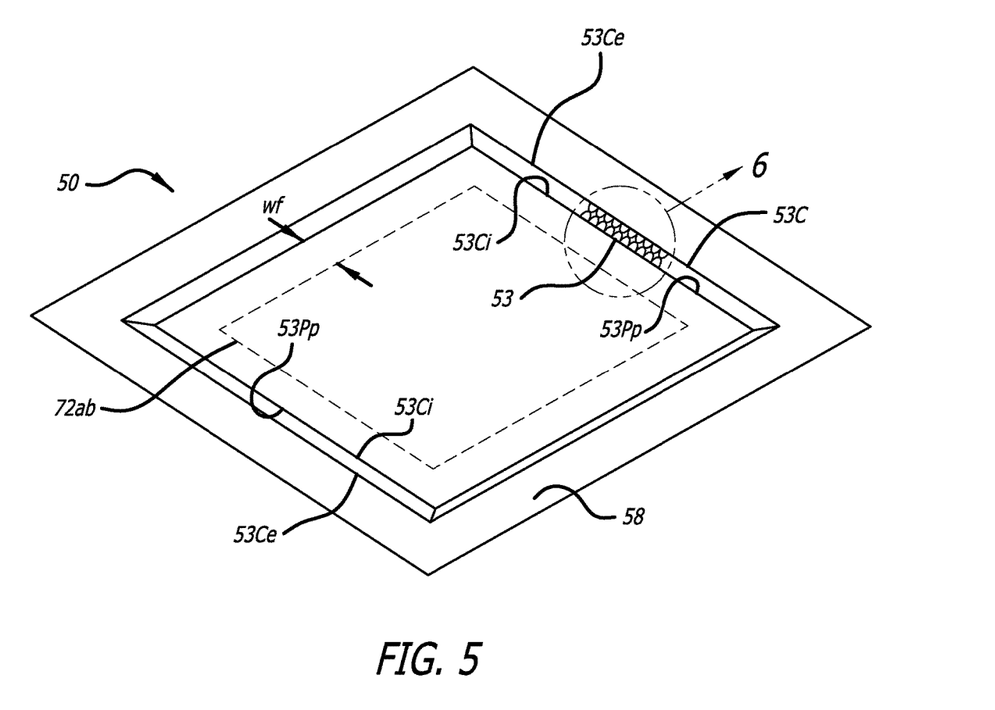
FIG. 5 is a perspective view of an uncured honeycomb sandwich structure in accordance with the present invention.
Figure 6:
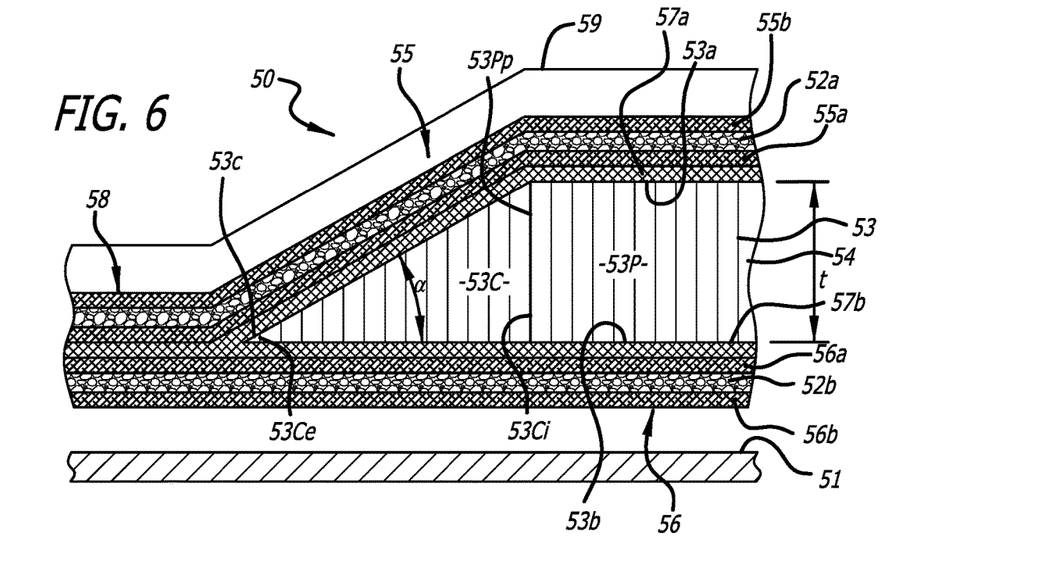
FIG. 6 is a side view of the section of the uncured honeycomb sandwich structure that corresponds to the section shown in circle 6 of FIG. 5. In this embodiment of the invention, the light weight veils cover the entire area of the honeycomb.

FIG. 5 is a perspective view of an exemplary uncured honeycomb sandwich structure 50. FIG. 6 is a detailed side view of the section of uncured honeycomb sandwich structure 50 that corresponds to the section shown in circle 6 of FIG. 5. In FIG. 6, the honeycomb sandwich structure 50 is shown adjacent to a mold surface 51 in an autoclave or vacuum bag system for curing. The section of the uncured honeycomb sandwich structure 50 shown in FIG. 6 is basically the same as the section of uncured honeycomb sandwich structure 10 shown in FIG. 3, except that an exemplary placement of fiber veils 52a and 52b in accordance with the present invention is shown in FIG. 6.

The uncured honeycomb sandwich structure 50 includes a honeycomb 53 which has a first edge 53a, a second edge 53b and a perimeter 53c wherein the distance between the first edge and second edge defines the thickness (t) of the honeycomb. The honeycomb 53 is composed of a plurality of cells that are defined by walls 54 which extend between the first and second edges in the thickness direction. The honeycomb 53 is chamfered around its perimeter so that the central section of the honeycomb forms a primary section 53P having a primary section perimeter 53Pp that surrounds and defines the primary section area of the honeycomb 53.

The chamfer section 53C is located adjacent to the primary section 53P. The chamfer section 53C has an exterior border 53Ce and an interior border 53Ci which straddle and define the chamfer section area. The exterior border of the chamfer section 53Ce coincides with the perimeter 53c of the honeycomb and the interior border 53Ci coincides with the perimeter 53Pp of the primary section. The chamfer section 53C has a chamfer section width (x), as shown in FIG. 3, which is the distance between the exterior border and the interior border of the chamfer section. The honeycomb is cut in the chamfer section 53C such that first edge 53a of the honeycomb tapers towards the second edge 53b and wherein the thickness of said honeycomb in said chamfer section decreases from the interior border to said exterior border. The chamfer section 53C has a cross-section corresponding to a right triangle having a hypotenuse "y" along the first edge 53a of the honeycomb and a chamfer angle "a" where the legs of the right triangle are formed by the lateral width of the chamfer "x" along the second edge 53b and the thickness "t" of the honeycomb along the interior border 53Ci of the chamfer section.

An uncured first face sheet 55 is located adjacent to the first edge of the honeycomb. The uncured face sheet 55 includes a first inner layer 55a located nearest to the first edge of the honeycomb and a first outer layer 55b. The first inner and outer layers are each is composed of a fibrous layer and uncured resin. Preferably, each layer is formed from a ply of prepreg.

An uncured second face sheet 56 is located adjacent to the second edge of the honeycomb. The uncured face sheet 56 includes a second inner layer 56a located nearest to the second edge of the honeycomb and a second outer layer 56b. The second inner and outer layers are each also composed of a fibrous layer and uncured resin. Preferably, each layer is also formed from a ply of prepreg.

The face sheets 55 and 56 are typically bonded to the honeycomb edges 53a and 53b, respectively, using separate adhesive layers 57a and 57b. The types of adhesive used to form the adhesive layer include epoxies, acrylics, phenolics, cyanoacrylates, bismaleimides, polyamide-imides and polyimides. For high temperature operations, phenolic and bismaleimide adhesives are preferred. As is known, the uncured resin that is present in the face sheet may be used as the bonding adhesive in order to eliminate the need for a separate adhesive layer. This type of face sheet is commonly referred to as a "self-adhesive" face sheet. For example, see U.S. Pat. No. 6,508,910, the contents of which is hereby incorporated by reference.

A first friction promoting layer made up of a light weight veil 52a is shown located between the first inner layer 55a and first outer layer 55b of the first face sheet. The light weight veil 52a may optionally be located on the inner side of the first inner layer 55a between the first inner layer 55a and the adhesive layer 57a. In certain situations, it may be desirable to locate veils on both sides of the first inner layer 55a. FIG. 6 is a partially schematic representation of the uncured sandwich structure for demonstrative purposes. The relative sizes and dimensions of the various layer are not to scale. For example, the light weight veils are actually thinner than the fibrous prepreg layers. A second friction promoting layer made up of a light weight veil 52b is shown located between the second inner layer 56a and second outer layer 56b of the second face sheet. The light weight veil 52b may also be located on the inner side of the second inner layer 56a between the second inner layer 56a and the adhesive layer 57b. In certain situations, it may be desirable to locate veils on both sides of the second inner layer 56a. The veils and face sheets come together and extend out past the perimeter 53c of the honeycomb to form a perimeter flange 58. The width of the perimeter flange 58 may vary depending upon the intended use and design of the sandwich structure. The width of the perimeter flange 58 will typically vary from a fraction of an inch (cm) to 2 inches (5 cm) or more.

The light weight veils 52a and 52b cover the entire surface areas of both the primary section of the honeycomb 53P and the chamfer section 53C. Preferably at least 95% of the surface area of both sections is covered and more preferably at least 99% of the surface area is covered. It is preferred that both light weight veils 52a and 52b be used in order to provide maximum resistance to core crush. The light weight veil 52b, which is located closest to the mold, may be eliminated where core crush is not particularly severe. This may sometimes be the case where the chamfer angle (α) is relatively small (less than 45 degrees) and/or where the lateral strength of the honeycomb in the chamfer section is high. However, in most circumstances it is necessary and desirable to keep at least some lightweight veil 52b located closest to the mold.

A surface finish layer 59 is shown being included as part of the uncured sandwich structure 50. A surface finish layer is optional and may not be required for many types of sandwich structures. When present, the surface finish layer 59 may include any of the known surface finishing materials that are used to provide a desired surface finish for the panel. Exemplary surface finish layers include gel coats, layers of plastic, resin impregnated fabrics or veils.

Figure 7:
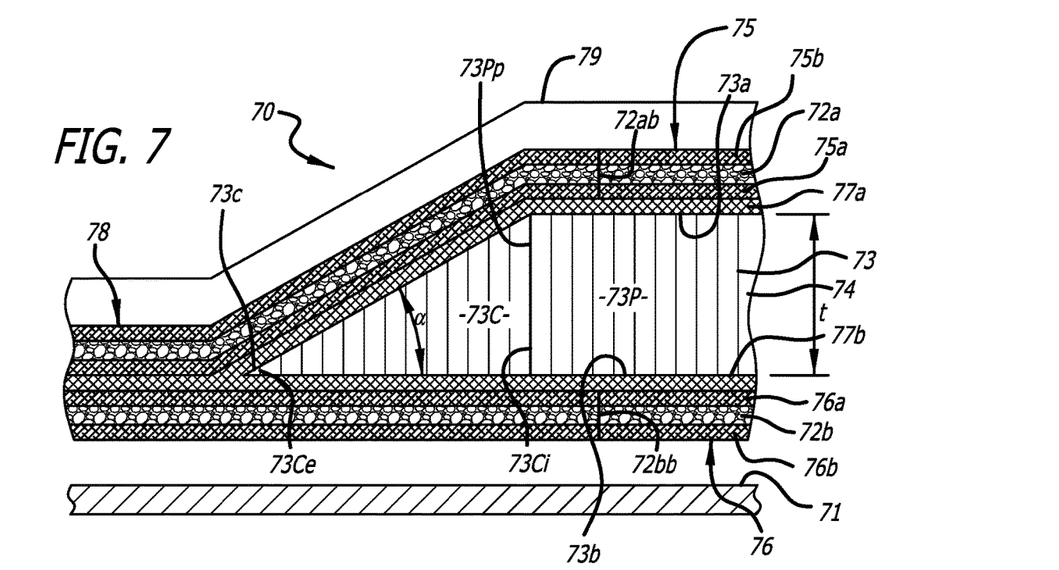
FIG. 7 is a side view of the section of an alternate uncured honeycomb sandwich structure. In this embodiment of the invention, the light weight veils do not cover the entire area of the honeycomb.

An alternate uncured honeycomb sandwich structure 70 is shown in FIG. 7. FIG. 7 is also a partially schematic representation of the uncured sandwich structure for demonstrative purposes. The relative sizes and dimensions of the various layer are not to scale. For example, the light weight veils are actually thinner than the fibrous prepreg layers. The uncured honeycomb sandwich structure 70 is shown in place on the surface 71 of a mold in an autoclave or vacuum bag system for curing. The uncured honeycomb sandwich structure 70 is the same as the uncured honeycomb sandwich structure 50, except that the lightweight fiber veils 72a and 72b do not cover the entire surface area of the primary section 73P.

The uncured honeycomb sandwich structure 70 includes a honeycomb 73 which has a first edge 73a, a second edge 73b and a perimeter 73c wherein the distance between the first edge and second edge defines the thickness (t) of the honeycomb. The honeycomb 73 is composed of a plurality of cells that are defined by walls 74 which extend between said first and second edges in the thickness direction. The honeycomb 73 is chamfered around its perimeter so that the central section of the honeycomb forms a primary section 73P having a primary section perimeter 73Pp that surrounds and defines the primary section area of the honeycomb 73.

The chamfer section 73C is located adjacent to the primary section 73P. The chamfer section 73C has an exterior border 73Ce and an interior border 53Ci which straddle and define the chamfer section area. The exterior border of the chamfer section 53Ce coincides with the perimeter 53c of the honeycomb and the interior border 73Ci coincides with the perimeter 73Pp of the primary section.

An uncured first face sheet 75 is located adjacent to the first edge of the honeycomb. The uncured face sheet 75 includes a first inner layer 75a located nearest to the first edge of the honeycomb and a first outer layer 75b. The first inner and outer layers are each is composed of a fibrous layer and uncured resin. Preferably, each layer is formed from a ply of prepreg.

An uncured second face sheet 76 is located adjacent to the second edge of the honeycomb. The uncured face sheet 76 includes a second inner layer 76a located nearest to the second edge of the honeycomb and a second outer layer 76b. The second inner and outer layers are each also composed of a fibrous layer and uncured resin. Preferably, each layer is also formed from a ply of prepreg.

The face sheets 75 and 76 are bonded to the honeycomb edges 73a and 73b, respectively, using separate adhesive layers 77a and 77b. A surface finish layer 79 is included as part of the uncured sandwich structure 70. The veils and face sheets come together and extend out past the perimeter 73c of the honeycomb to form a perimeter flange 78.

In this embodiment, the first friction promoting layer is a light weight veil 72*a* that does not cover the entire surface area of the primary honeycomb section. Instead, the light weight veil 72*a* has an interior border 72*ab* which is also shown in phantom on perspective view of the uncured sandwich panel 50 (FIG. 3). The overlap of the light weight veil 72*a* onto the primary section 73P forms a frame-shaped friction zone that has a width "wf" defined by the distance between the perimeter 73Pp of the primary section and the interior border 72*ab* of the veil 72*a*. The second friction promoting layer is a light weight veil 72*b* that also does not cover the entire surface area of the primary honeycomb section. The light weight veil has an interior border 72*bb*. The overlap of the light weight veil 72*b* onto the primary section 73P also forms a frame-shaped friction zone that has a width "wf" defined by the distance between the perimeter 73Pp of the primary section and the interior border 72*bb* of the veil 72*b*.

The width (wf) of the friction zones may be varied to provide desired coverage over the primary section area. The friction zone width does not have to be uniform in size or shape. However, it is preferred that the friction zone forms a uniform flame structure around the perimeter of the honeycomb primary section. The area of the primary section covered by each light weight veil should be at least 10% and no more than 90%. The preferred coverage is less than 50% of the total area of the primary section in order to keep added weight and cost to a minimum. The degree of veil coverage chosen for a particular sandwich structure will depend upon a number of factors including, the areal weights of the veils and face sheets, the honeycomb strength, the desired reduction in core crush and the amount of added weight that can be tolerated. It is preferred that both light weight veils 72*a* and 72*b* be used in order to provide maximum resistance to core crush. However, the light veil 72*b*, which is located closest to the mold, may be eliminated in situations where core crush is not particularly severe.

Curing or molding of the uncured sandwich structures is accomplished using known autoclave or vacuum bag molding procedures. Such procedures typically subject the uncured sandwich structure to pressures of up to 45 psi and temperatures of 150-200° C. for up to 2 hours or more.

As examples of practice, two uncured sandwich panels of the type shown in FIGS. 5-6 were prepared and tested for core crush. The honeycomb was 3 pounds pcf HRH® 10 honeycomb having ⅛ inch (0.3 cm) cells. The honeycomb was 20 inches (50.8 cm) wide, 24 inches (61 cm) long and 0.5 inch (1.3 cm) thick. The chamfer angle was 20°. Each of the inner and outer layers of the face sheets were a single ply prepreg composed of woven AS4C carbon fibers and a rubber-toughened epoxy resin, which is available as HexPly® M70 prepreg from Hexcel Corporation (Dublin, Calif.). The prepreg layers were 24 inches (61 cm) wide and 28 inches (71 cm) long. The adhesive layer was 0.035 inch (0.089 cm) thick. The adhesive used to form the adhesive layer was Hysol®PL7000 epoxy adhesive, which is available from Henkel (Herborn, Germany).

In the first uncured sandwich structure example, the light weight veils 52*a* and 52*b* were 4 gsm Optiveil® T2548-32 carbon fiber veils which are composed of wet laid randomly oriented nonwoven carbon fiber filaments having a diameter of 5 microns and a cross linked styrene acrylic binder. The filaments are each 12 mm long. In the second uncured sandwich structure example, the light weight veils were 4 gsm Optiveil® 20352A carbon fiber veils which are composed of wet laid randomly oriented non-woven carbon fiber filaments having a diameter of 7.5 microns and a cross linked styrene acrylic binder. The weight percent of binder in both of the veils was the same.

The exemplary uncured sandwich panels were cured in an autoclave for 2 hours at a temperature of 177° C. and a pressure of 45 psi. The core crush for the first cured sandwich structure example was only 1%. Core crush is determined by measuring the area of the honeycomb in the uncured structure and comparing the initial honeycomb area to the area of the honeycomb in the cured structure. Core crush is expressed as the percent reduction in the overall area of honeycomb that occurs during curing/molding. Core crush on the order of 10% or more is not acceptable, especially for aerospace applications. It is preferred that core crush be limited to 5% or less. A core crush of only 1% is well within acceptable limits for routine sandwich panel fabrication. Removal of the light weight veils from the first uncured honeycomb structure example results in the core crush rising to well above 10%. The first example demonstrates that the present invention provides an effective way to reduce core crush to below acceptable limits while at the same time only marginally (2×4 gsm) increasing the weight of the sandwich panel structure, if at all.

The core crush for the second cured sandwich structure example was slightly higher than the first example. Although this is well below the preferred acceptable core crush limit of 5%, it is also slightly above the core crush that was obtained in the first example. In the first example, the same areal weight carbon fiber veil was used, however, the filaments had a smaller diameter. Accordingly, it is preferred that the diameter of the filaments in the light weight veil layers be from 4 to 6 microns in order to provide the maximum reduction in core crush for a given areal weight and especially for veils having areal weights of from 3 to 10 gsm.

A third exemplary uncured sandwich structure was prepared which was the same as the first two examples, except that the light weight veils were 2 gsm Optiveil® T2548-32 carbon fiber veils.

The third exemplary uncured sandwich structure was cured in the same manner as the first two examples. The resulting core crush was 7%. This example demonstrates that to limit core crush to less than 5% for this type of sandwich structure, it is necessary to use veils that weigh at least 3 gsm and preferably 4 gsm.

The above examples demonstrate that 4 gsm veils are capable of reducing core crush to levels on the order of 1%. An increase in the areal weight of the veils does not provide any substantial further reduction in core crush and may even reduce the friction promoting effect of the veils. Accordingly, it is preferred that the weight of the veils be kept at levels below 20 gsm and preferably below 10 gsm in order to limit the amount of weight that is added to the panel structure. In addition, the diameter of the filaments used in the veils was found to affect the friction promoting capability of the veil and the resulting reduction in core crush. Accordingly, the veil filament diameters should be below 25 microns and preferably in the range of 3 to 10 microns.

The use of light weight veils in accordance with the present invention is suitable for reducing core crush in uncured honeycomb sandwich structures that may or may not have chamfered perimeters. The invention is more useful in situations where the chamfer angle is relatively high (45 to 890), the chamfer width is relatively wide (1 to 5 cm) and/or the honeycomb lateral strength is not high (2-5 pcf honeycomb).

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited by the above-described embodiments, but is only limited by the following claims.

What is claimed is:

1. An uncured sandwich structure in which a core comprising a honeycomb having a honeycomb perimeter is sandwiched between a first face sheet and a second face sheet, said honeycomb including a primary section and a chamfer section located adjacent to said primary section, said chamfer section having an interior border and an exterior border that coincides with said honeycomb perimeter, said chamfer section having a thickness that decreases from said interior border to said exterior border such that said chamfer section is subject to crushing during curing of said uncured sandwich structure, said uncured sandwich structure comprising:
  A) a core comprising a honeycomb having a first edge, a second edge and a perimeter wherein the distance between said first edge and second edge defines the thickness of said honeycomb, said honeycomb comprising a plurality of cells that are defined by walls which extend between said first and second edges in a thickness direction, said honeycomb comprising:
    a) a primary section having a primary section perimeter that defines a primary section area of said honeycomb;
    b) a chamfer section located adjacent to said primary section, said chamfer section having an exterior border and an interior border that defines a chamfer section area wherein said exterior border coincides with the perimeter of said honeycomb and said interior border coincides with said primary section perimeter, said chamfer section having a chamfer section width defined by the distance between said exterior border and said interior border and wherein the thickness of said honeycomb in said chamfer section decreases from said interior border to said exterior border;
  B) an uncured first face sheet located adjacent to the first edge of said honeycomb, said uncured first face sheet comprising a first inner layer located nearest to the first edge of said honeycomb and a first outer layer, said first inner layer and said first outer layer each comprising a fibrous layer that has an areal weight of 80-600 grams per square meter and uncured resin, said uncured first face sheet covering both said primary section area and said chamfer section area;
  C) an uncured second face sheet located adjacent to the second edge of said honeycomb, said uncured second face sheet comprising a second inner layer located nearest to the second edge of said honeycomb and a second outer layer, said second inner layer and said second outer layer each comprising a fibrous layer layer that has an areal weight of 80-600 grams per square meter and uncured resin, said uncured second face sheet covering both said primary section area and said chamfer section area; and
  D) a first friction-promoting layer located between said first inner layer and said first outer layer, said first friction promoting layer comprising a first fibrous veil and a first resin binder wherein said first friction-promoting layer provides a reduction in the crushing of said core during curing of said uncured sandwich structure, wherein said first friction promoting layer covers substantially all of said chamfer section area and up to 50 percent of the primary section area and wherein the first friction promoting layer has an areal weight of 2 to 20 grams per square meter.

2. An uncured sandwich structure according to claim 1 wherein first inner layer and said first outer layer each comprise a fibrous layer comprising carbon fiber and said fibrous veil comprises carbon fiber.

3. An uncured sandwich structure according to claim 2 wherein said first fibrous veil and said first binder resin have a combined areal weight of from 3 to 10 grams per square meter.

4. An uncured sandwich structure according to claim 1 which comprises a second friction-promoting layer located between said second inner layer and said second outer layer, said second friction promoting layer comprising a second fibrous veil and a second binder resin wherein said second friction-promoting layer provides a reduction in the crushing of said core during curing of said uncured sandwich structure, wherein said second friction promoting layer covers substantially all of said chamfer section area and up to 50 percent of the primary section area and wherein the second friction promoting layer has an areal weight of 2 to 20 grams per square meter.

5. An uncured sandwich structure according to claim 4 wherein said second inner layer and said second outer layer each comprise a fibrous layer comprising carbon fiber and said second fibrous veil comprises carbon fiber.

6. An uncured sandwich structure according to claim 5 wherein said second fibrous veil and said second binder resin have a combined areal weight of from 3 to 10 grams per square meter.

7. An uncured sandwich structure according to claim 1 wherein said second edge in said primary section and said second edge in said chamfer section define a coplanar surface, said first edge in said primary section being parallel to said coplanar surface and wherein said first edge in said chamfer section extends at a chamfer angle relative to said coplanar surface.

8. An uncured sandwich structure according to claim 1 wherein said uncured resin in the first face sheet and the second face sheet comprises an uncured thermosetting resin and said binder resin is selected from the group consisting of cross linked styrene acrylic resin, epoxy resin, cross-linked polyester resin, polyvinyl alcohol, styrene, co-polyester, polyurethane, fluoropolymer and polyimide.

9. A sandwich structure comprising an uncured sandwich structure according to claim 1 that has been cured.

10. A sandwich panel structure comprising an uncured sandwich structure according to claim 4 that has been cured.

11. A method for making an uncured sandwich structure in which a core comprising a honeycomb having a honeycomb perimeter is sandwiched between a first face sheet and a second face sheet, said honeycomb including a primary section and a chamfer section located adjacent to said primary section, said chamfer section having an interior border and an exterior border that coincides with said honeycomb perimeter, said chamfer section having a thickness that decreases from said interior border to said exterior border such that said chamfer section is subject to crushing during curing of said uncured sandwich structure, said method comprising the steps of:
  A) providing a core comprising a honeycomb having a first edge, a second edge and a perimeter wherein the distance between said first edge and second edge defines the thickness of said honeycomb, said honeycomb comprising a plurality of cells that are defined by walls which extend between said first and second edges in a thickness direction, said honeycomb comprising:
a) a primary section having a primary section perimeter that defines a primary section area of said honeycomb;
b) a chamfer section located adjacent to said primary section, said chamfer section having an exterior border and an interior border that defines a chamfer section area wherein said exterior border coincides with the perimeter of said honeycomb and said interior border coincides with said primary section perimeter, said chamfer section having a chamfer section width defined by the distance between said exterior border and said interior border and wherein the thickness of said honeycomb in said chamfer section decreases from said interior border to said exterior border;
B) locating an uncured first face sheet adjacent to the first edge of said honeycomb, said uncured first face sheet comprising a first inner layer located nearest to the first edge of said honeycomb and a first outer layer, said first inner layer and said first outer layer each comprising a fibrous layer that has an areal weight of 80-600 grams per square meter and uncured resin, said uncured first face sheet covering both said primary section area and said chamfer section area;
C) locating an uncured second face sheet adjacent to the second edge of said honeycomb, said uncured second face sheet comprising a second inner layer located nearest to the second edge of said honeycomb and a second outer layer, said second inner layer and said second outer layer each comprising a fibrous layer that has an areal weight of 80-600 grams per square meter and uncured resin, said uncured second face sheet covering both said primary section area and said chamfer section area; and
D) locating a first friction-promoting layer between said first inner layer and said first outer layer prior to locating said uncured first face sheet adjacent to the first edge of said honeycomb, said first friction promoting layer comprising a first fibrous veil and a first resin binder wherein said first friction-promoting layer provides a reduction in the crushing of said core during curing of said uncured sandwich structure, wherein said first friction promoting layer covers substantially all of said chamfer section area and up to 50 percent of the primary section area and wherein the first friction promoting layer has an areal weight of 2 to 20 grams per square meter.

12. A method for making an uncured sandwich structure according to claim 11 which includes the additional step of locating a second friction-promoting layer between said second inner layer and said second outer layer prior to locating said uncured second face sheet adjacent to the second edge of said honeycomb, said second friction promoting layer comprising a second fibrous veil and a second binder resin wherein said second friction-promoting layer provides a reduction in the crushing of said core during curing of said uncured sandwich structure, wherein said second friction promoting layer covers substantially all of said chamfer section area and up to 50 percent of the primary section area and wherein the second friction promoting layer has an areal weight of 2 to 20 grams per square meter.

13. A method for making an uncured sandwich structure according to claim 11 wherein first inner layer and said first outer layer each comprise a fibrous layer comprising carbon fiber and said fibrous veil comprises carbon fiber.

14. A method for making an uncured sandwich panel structure according to claim 13 wherein said uncured resin in the first face sheet and the second face sheet comprises an uncured thermosetting resin and said binder resin is selected from the group consisting of cross linked styrene acrylic resin, epoxy resin, cross-linked polyester resin, polyvinyl alcohol, styrene, co-polyester, polyurethane, fluoropolymer and polyimide.

15. A method for making a sandwich panel which comprises the method according to claim 11 and the additional step of curing said uncured sandwich panel.

16. A method for making a sandwich panel comprising the steps of providing an uncured sandwich panel according to claim 1 and curing said uncured sandwich panel to form said sandwich panel.

* * * * *